(12) United States Patent
Freed et al.

(10) Patent No.: US 12,143,492 B2
(45) Date of Patent: Nov. 12, 2024

(54) METHOD AND APPARATUS FOR PROVIDING STRONG MUTUAL AUTHENTICATION, ENCRYPTION, AND INTEGRITY FOR CONSTRAINT DEVICES WITHOUT SECURE STORAGE AND PKI SUPPORT

(71) Applicant: Cisco Technology, Inc., San Jose, CA (US)

(72) Inventors: Michael Freed, Pleasanton, CA (US); Elango Ganesan, Portola Valley, CA (US); Swapna Anandan, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 287 days.

(21) Appl. No.: 17/817,422

(22) Filed: Aug. 4, 2022

(65) Prior Publication Data

US 2024/0048384 A1 Feb. 8, 2024

(51) Int. Cl.
*H04L 9/32* (2006.01)
*H04L 9/40* (2022.01)

(52) U.S. Cl.
CPC .......... *H04L 9/3213* (2013.01); *H04L 9/3273* (2013.01); *H04L 63/123* (2013.01)

(58) Field of Classification Search
None
See application file for complete search history.

(56) References Cited

U.S. PATENT DOCUMENTS

| | | | |
|---|---|---|---|
| 9,258,295 B1* | 2/2016 | Nedeltchev | H04L 63/0823 |
| 2015/0113275 A1* | 4/2015 | Kim | H04L 9/0877 |
| | | | 713/169 |
| 2015/0281189 A1 | 10/2015 | Nayshut et al. | |
| 2015/0319150 A1 | 11/2015 | Smith et al. | |
| 2015/0365238 A1 | 12/2015 | Hui et al. | |
| 2016/0323689 A1* | 11/2016 | Goluboff | H04L 63/0823 |
| 2016/0366183 A1* | 12/2016 | Smith | H04L 63/06 |
| 2018/0183802 A1* | 6/2018 | Choyi | H04L 63/205 |
| 2019/0014117 A1* | 1/2019 | Li | H04L 67/14 |
| 2020/0344115 A1* | 10/2020 | Power | H04L 67/34 |
| 2020/0403808 A1 | 12/2020 | Smith et al. | |
| 2021/0067505 A1* | 3/2021 | Gandhi | H04L 41/5019 |
| 2021/0096881 A1* | 4/2021 | Perlman | H04L 63/0876 |
| 2021/0152633 A1* | 5/2021 | Gorilovsky | H04L 67/1097 |
| 2021/0342462 A1 | 11/2021 | Nix | |

(Continued)

*Primary Examiner* — Christopher C Harris
(74) *Attorney, Agent, or Firm* — Polsinelli P.C.

(57) ABSTRACT

A zero-touch deployment (ZTD) manager receives a first request to issue a first cryptographic token to a constrained device for establishing a communications session between the constrained device and a secured resource. The ZTD manager evaluates identity information corresponding to the constrained device and determines whether the identity information is valid. If so, the ZTD manager returns the first cryptographic token to the constrained device, where it is stored in cache memory. The ZTD manager receives a second request to obtain a second cryptographic token from the secured resource. When the second cryptographic token is provided to the secured resource, the secured resource uses this second cryptographic token to validate the first cryptographic token and to facilitate the communications session with the constrained device.

20 Claims, 8 Drawing Sheets

(56) References Cited

U.S. PATENT DOCUMENTS

| | | | |
|---|---|---|---|
| 2021/0352472 A1* | 11/2021 | Ganesan | H04L 63/0272 |
| 2021/0377361 A1* | 12/2021 | Rajani | H04W 12/61 |
| 2022/0386124 A1* | 12/2022 | Kb | H04W 12/06 |
| 2023/0006993 A1* | 1/2023 | Bilgin | H04W 12/65 |

* cited by examiner

METHOD AND APPARATUS FOR PROVIDING STRONG MUTUAL AUTHENTICATION, ENCRYPTION, AND INTEGRITY FOR CONSTRAINT DEVICES WITHOUT SECURE STORAGE AND PKI SUPPORT

TECHNICAL FIELD

The present disclosure generally relates to the field of computer networking, particularly with regard to the mutual authentication and encryption for constrained devices.

BACKGROUND

The proliferation of Internet-of-Things (IoT) devices has allowed for the automation and control of routine tasks without any human intervention. This had led to greater efficiencies, allowing myriad IoT devices to communicate with other systems, services, and other resources in order to minimize human effort. In order to communicate with these other systems, services, and other resources, the IoT devices implemented within a networked environment may need to be authenticated by these other systems, services, and other resources. However, certain IoT devices, such as constrained devices, may not have the secure storage and computational capabilities required to encrypt and store authentication keys needed for authentication of these IoT devices. This can make introduction of such IoT devices difficult, as without such capabilities, the process for authenticating these IoT devices can be incredibly complex. As a result, users often require solutions that allow them to more easily implement and allow for authentication of IoT devices, such as the aforementioned constrained devices, within a networked environment.

BRIEF DESCRIPTION OF THE FIGURES

To provide a more complete understanding of the present disclosure and features and advantages thereof, reference is made to the following description, taken in conjunction with the accompanying drawings, in which.

DETAILED DESCRIPTION

Figure 1:
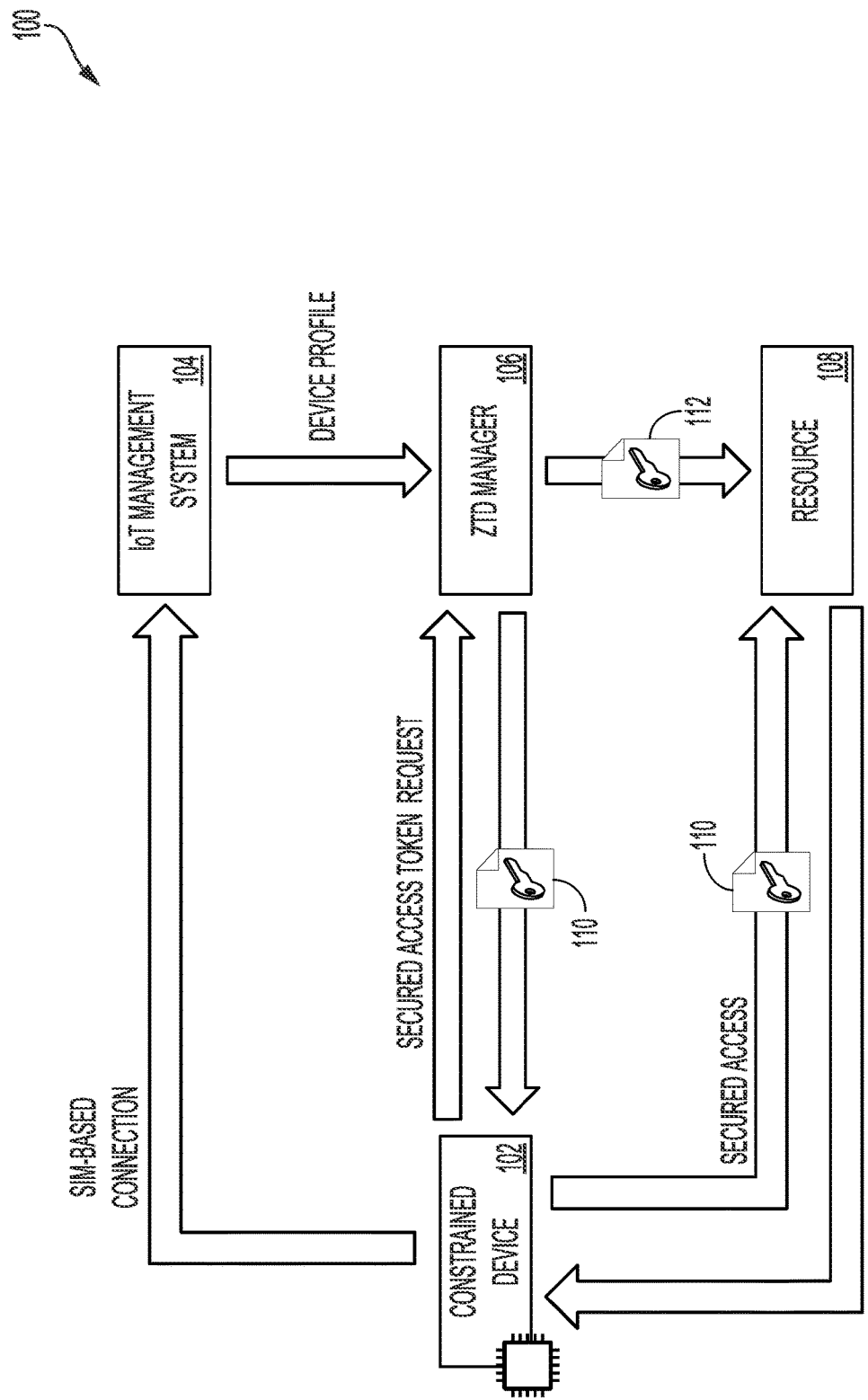
FIG. 1 shows an illustrative example of an environment in which a zero-touch deployment (ZTD) manager facilitates the dynamic assignment of cryptographic tokens to a constrained device and to secured resources to enable authentication of the constrained device and the secured resources in accordance with at least one embodiment.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Disclosed herein are systems, methods and computer-readable storage media for providing strong mutual authentication and encryption for constrained devices to enable these constrained devices to be authenticated by other services.

In an example, a computer-implemented method comprises receiving a first request to issue a first cryptographic token. This first cryptographic token is usable to facilitate a communications session between a constrained device and a secured resource. Further, the first request corresponds to the constrained device. As described in further detail herein, the constrained device lacks secured storage capabilities. The computer-implemented method further comprises evaluating identity information corresponding to the constrained device according to a known profile associated with the constrained device. The computer-implemented method further comprises determining that the identity information is valid. The computer-implemented method further comprises returning a cryptographic token response. The cryptographic token response includes the first cryptographic token. Further, when the first cryptographic token is received at the constrained device, the constrained device maintains the first cryptographic token in cache memory. The computer-implemented method further comprises receiving a second request to obtain a second cryptographic token. The second cryptographic token is associated with the first cryptographic token and the second request corresponds to the secured resource. The computer-implemented method further comprises providing the second cryptographic token. When the second cryptographic token is received at the secured resource, the secured resource uses the second cryptographic token to validate the first cryptographic token and to facilitate the communications session.

In an example, the first cryptographic token corresponds to an expiration date such that when the expiration date is elapsed, the first cryptographic token is automatically expired.

In an example, the first cryptographic token corresponds to a usage limit such that when the first cryptographic token is used a number of times that is equal to the usage limit, the first cryptographic token is automatically expired.

In an example, the computer-implemented method further comprises receiving a new request to issue a new cryptographic token for a new communications session between the constrained device and the secured resource. The new request is generated as a result of the first cryptographic token being expired. The computer-implemented method further comprises validating the identity information corresponding to the constrained device according to the known profile associated with the constrained device and returning the new cryptographic token.

In an example, the constrained device implements a set of services, and wherein the first cryptographic token is usable by the set of services to access the secured resource.

In an example, the the constrained device lacks Public Key Infrastructure (PKI) computation capabilities.

In an example, the the first cryptographic token and the second cryptographic token are associated with a zero-touch deployment (ZTD) manager. Further, the ZTD manager assigns the first cryptographic token to the constrained device in response to the first request.

In an example, a system comprises one or more processors and memory storing thereon instructions that, as a result of being executed by the one or more processors, cause the system to receive a first request to issue a first cryptographic token. This first cryptographic token is usable to facilitate a communications session between a constrained device and a secured resource. Further, the first request corresponds to the constrained device. As noted above, the constrained device lacks secured storage capabilities. The instructions further cause the system to evaluate identity information corresponding to the constrained device according to a known profile associated with the constrained device. The instructions further cause the system to determine that the identity information is valid. The instructions further cause the system to return a cryptographic token response. The cryptographic token response includes the first cryptographic token. Further, when the first cryptographic token is received at the constrained device, the constrained device maintains the first cryptographic token in cache memory. The instructions further cause the system to receive a second request to obtain a second cryptographic token. The second cryptographic token is associated with the first cryptographic token and the second request corresponds to the secured resource. The instructions further cause the system to provide the second cryptographic token. When the second cryptographic token is received at the secured resource, the secured resource uses the second cryptographic token to validate the first cryptographic token and to facilitate the communications session.

In an example, a non-transitory computer-readable storage medium stores thereon executable instructions that, as a result of being executed by one or more processors of a computer system, cause the computer system to receive a first request to issue a first cryptographic token. This first cryptographic token is usable to facilitate a communications session between a constrained device and a secured resource. Further, the first request corresponds to the constrained device. As noted above, the constrained device lacks secured storage capabilities. The executable instructions further cause the computer system to evaluate identity information corresponding to the constrained device according to a known profile associated with the constrained device. The executable instructions further cause the computer system to determine that the identity information is valid. The executable instructions further cause the computer system to return a cryptographic token response. The cryptographic token response includes the first cryptographic token. Further, when the first cryptographic token is received at the constrained device, the constrained device maintains the first cryptographic token in cache memory. The executable instructions further cause the computer system to receive a second request to obtain a second cryptographic token. The second cryptographic token is associated with the first cryptographic token and the second request corresponds to the secured resource. The executable instructions further cause the computer system to provide the second cryptographic token. When the second cryptographic token is received at the secured resource, the secured resource uses the second cryptographic token to validate the first cryptographic token and to facilitate the communications session.

DESCRIPTION OF EXAMPLE EMBODIMENTS

Figure 7:
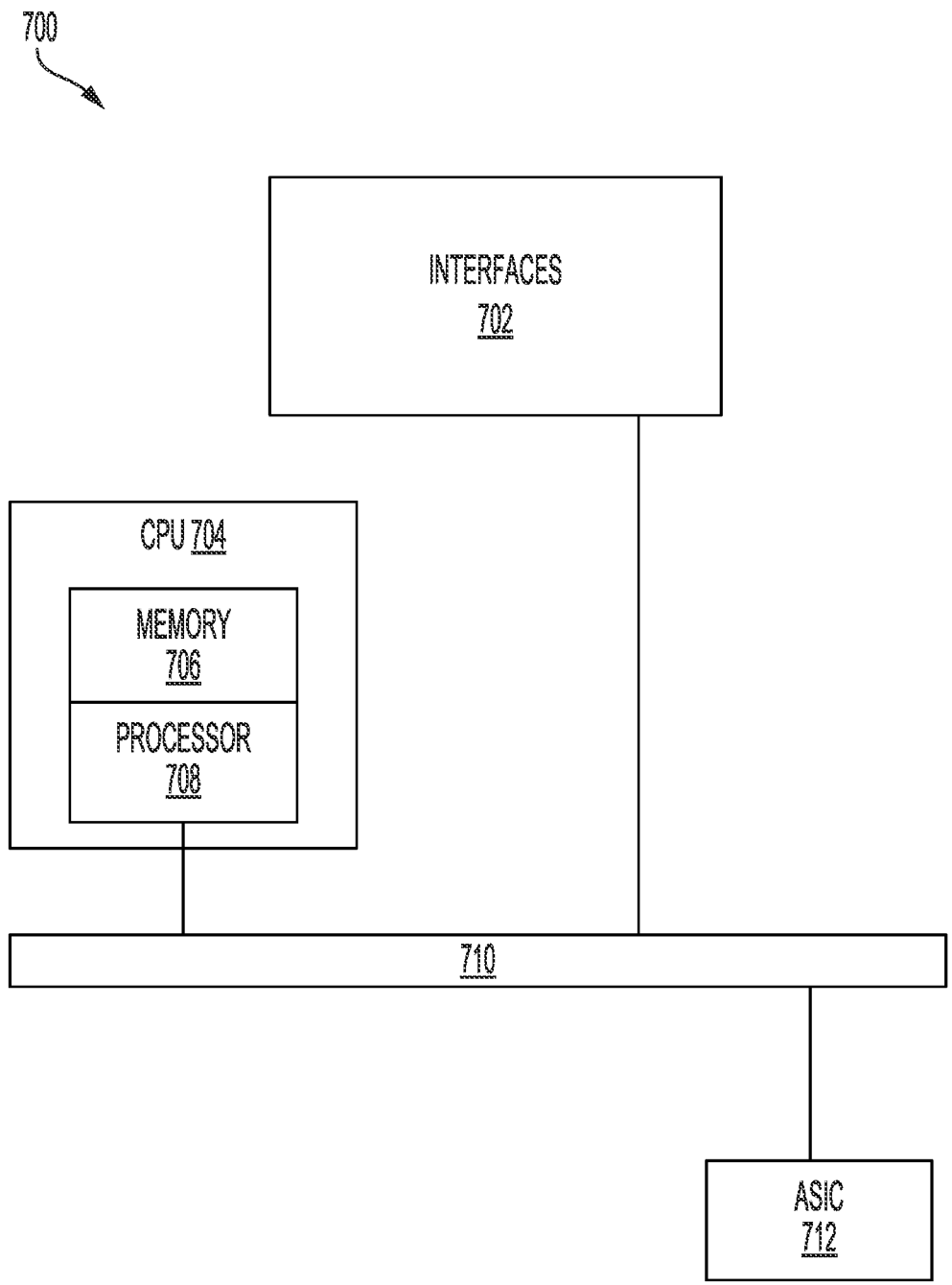
FIG. 7 illustrates an example network device suitable for performing switching, routing, and other networking operations in accordance with some embodiments.
Figure 8:
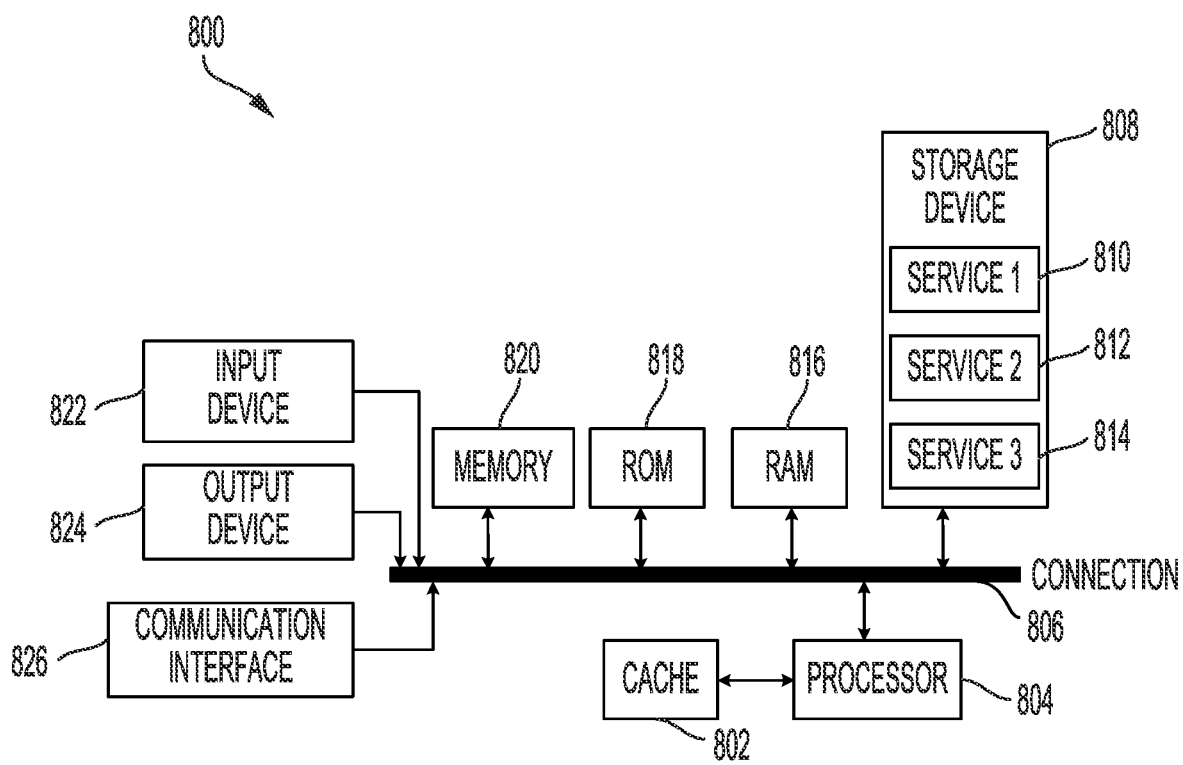
FIG. 8 illustrates a computing system architecture including various components in electrical communication with each other using a connection in accordance with some embodiments.

Disclosed herein are systems, methods and computer-readable storage media for providing strong mutual authentication and encryption for constrained devices to allow these constrained devices to be authenticated by other services. The present technologies will be described in more detail in the following disclosure as follows. The discussion begins with a detailed description of example systems, processes and environments for providing strong mutual authentication and encryption for constrained devices to allow these constrained devices to be authenticated by other services, as illustrated in FIGS. 1 through 6. The discussion concludes with a description of an example network and computing devices, as illustrated in FIGS. 7 and 8.

FIG. 1 shows an illustrative example of an environment 100 in which a ZTD manager 106 facilitates the dynamic assignment of cryptographic tokens 110, 112 to a constrained device 102 and to secured resources 108 to enable authentication of the constrained device 102 and the secured resources 108 in accordance with at least one embodiment. In the environment 100, a network architecture may be implemented that includes one or more constrained devices 102 and one or more secured resources 108 that may need to be able to communicate securely with one another in order to provide various functionalities. For example, the network architecture illustrated in FIG. 1 may be implemented for various connectivity applications, including, but not limited to, connected vehicles (vehicles that may communicate bi-directionally with other systems), home security and automation, payment and other point-of-sale implementations, system maintenance, connected meters, fleet management, and the like.

A constrained device 102, in an embodiment, is an IoT device that does not have secure storage capabilities or the compute capabilities required to enable use of PKI computation capabilities. For instance, a constrained device 102 may operate under various resource constraints such as limited battery and compute capabilities, limited memory capacity, and limited communications bandwidth and ability to communicate with other devices and systems. The limited capabilities and resources associated with a constrained device 102 may be defined based on any cost and/or physical constraints on characteristics of the constrained device 102. For instance, constrained devices 102 may need to be implemented in environments where the size and weight of the constrained devices 102 is to be minimized. Further, these constrained devices 102 may need to be implemented in environments where there are constraints on the amount of available power and energy.

In the environment 100, the constrained device 102, for example, may be an end node within the network architecture that includes one or more sensors and/or actuators that are implemented for a particular purpose. For instance, a constrained device 102 may be implemented to gather information in different settings (e.g., natural ecosystems, buildings, factories, etc.) and to send this information to other resources 108 within the networked architecture, such as server stations and the like. The constrained device 102 may further act on obtained information by performing one or more operations. These one or more operations may include updating a graphical interface implemented on the constrained device 102 to display the obtained information.

In an embodiment, the constrained device 102 includes an embedded SIM (eSIM) that encodes a set of SIM-based credentials that may be used to authenticate the constrained device 102. An eSIM may be integrated into the constrained device 102 in order to prevent removal or replacement of the eSIM with another SIM (e.g., a physical SIM, a different eSIM, etc.). The set of SIM-based credentials may include an international mobile subscriber identity (IMSI) and/or international mobile station equipment identity (IMEI) that may uniquely identify the constrained device 102 within the network architecture. Further, the set of SIM-based credentials may include an integrated circuit card identification number (ICCID) that uniquely identifies the eSIM or other SIM card implemented in the constrained device 102. The combination of the IMSI and/or IMEI, and the ICCID associated with the constrained device 102 may be used to track the constrained device 102 to eSIM or other SIM card binding and to prevent spoofing of the constrained device 102.

In an embodiment, the constrained device 102, when activated, establishes a SIM-based connection with an IoT management system 104. The IoT management system 104 may be a Software-as-a-Service (SaaS) platform that automatically and securely delivers visibility and control for launching, scaling, and management IoT services and devices, such as the constrained device 102. The IoT management system 104, in an embodiment, maintains active communication profiles for myriad IoT devices deployed for different network architectures and environment. For instance, the IoT management system 104 may maintain an active communication profile associated with the constrained device 102 that may be used to validate the constrained device 102 upon establishment of the SIM-based connection between the constrained device 102 and the IoT management system 104.

Through the SIM-based connection, the constrained device 102 may provide the set of SIM-based credentials associated with the constrained device 102, as well as a private access point name (APN) corresponding to the constrained device 102 for use within the network architecture. As noted above, the IoT management system 104 may maintain an active communication profile associated with the constrained device 102 that may be used to validate the constrained device 102. Accordingly, the IoT management system 104 may process the SIM-based credentials provided by the constrained device 102 over the SIM-based connection against the known active communication profile for the constrained device 102 to determine whether the constrained device 102 may be validated. For example, the IoT management system 104 may compare the ICCID and IMSI/IMEI provided by the constrained device 102 against the known ICCID and IMSI/IMEI for the constraint device 102 from the known active communication profile to determine whether these match. If the IoT management system 104 determines that there is a mismatch, the IoT management system 104 may automatically terminate the SIM-based connection, as the IoT management system 104 may not be able to validate the constrained device 102. For instance, a mismatch may be indicative of a SIM replacement within the constrained device 102, spoofing of the constrained device 102, IMSI/IMEI theft, and the like.

In an embodiment, if the IoT management system 104 is able to validate the constrained device 102 based on the provided SIM-based credentials, the IoT management system 104 pushes the active communication profile for the constrained device 102 to the ZTD manager 106 associated with the private APN indicated by the constrained device 102. The ZTD manager 106, in an embodiment, is a secured credential manager for all secured communications to and from the constrained device 102. Further, the ZTD manager 106 may automate the dynamic assignment of cryptographic tokens to the constrained device 102 and the secured resources 108 within the over-the-top (OTT)/enterprise network domain. The IoT management system 104 may securely communicate with the ZTD manager 106 through transport layer security (TLS)-based authentication or other form of authentication.

Upon validation of the constrained device 102, the IoT management system 104 may allow the constrained device 102 to establish a network connection on the ZTD private APN. This ZTD private APN may imply a dedicated private network that is present for the ZTD manager 106, through which an Internet Protocol security (IPsec) tunnel may be established between the ZTD manager 106 and the Third Generation Partnership Project (3GPP) packet core of the private network. This may allow the ZTD manager 106 to trust any Internet Protocol (IP) connections through the IPsec tunnel.

In an embodiment, when the constrained device 102 is to communicate with a particular secured resource 108, the constrained device 102 can transmit a secured access token request to the ZTD manager 106 to request a cryptographic token that may be used to establish a secure communications session with the secured resource 108. The secured access token request may include the SIM-based credentials associated with the constrained device 102. Further, the secured access token request may indicate the IP address allocated to the eSIM or other SIM card implemented on the constrained device 102. In response to the request, the ZTD manager 106 may evaluate the obtained SIM-based credentials against the active communication profile for the constrained device 102 obtained from the IoT management system 104 to determine whether the SIM-based credentials from the constrained device 102 and the known ICCID and IMSI/IMEI for the constraint device 102 from the known active communication profile match. Further, the ZTD manager 106 may validate the IP address allocated to the eSIM or other SIM card associated with the constrained device 102 by providing the IP address and the ICCID associated with the constrained device 102 to the IoT management system 104. The IoT management system 104 may evaluate the obtained IP address and the ICCID associated with the constrained device 102 to determine whether an association between this IP address and the ICCID exists. If so, the IoT management system 104 may transmit a notification to the ZTD manager 106 to indicate that the IP address is valid.

If the ZTD manager 106 is unable to validate the provided SIM-based credentials and/or the IP address associated with the constrained device 102, the ZTD manager 106 may deny the secured access token request. In some instances, the ZTD manager 106 may further transmit a notification to the IoT management system 104 to indicate that the constrained device 102 could not be validated. This may cause the IoT management system 104 to perform one or more remedial actions (e.g., terminating network connectivity for the constrained device 102, etc.). However, if the ZTD manager 106 determines that the constrained device 102 has been validated, the ZTD manager 106 may provide, to the constrained device 102, a token response. The token response may include a cryptographic token 110 that encodes the IMSI and private APN associated with the constrained device 102. In some instances, the IMSI and private APN may be encoded within the cryptographic token 110 using one or more Base64 encoding schemes or any other available and appropriate encoding schemes.

In an embodiment, the cryptographic token 110 is subject to one or more expiration conditions whereby if an expiration condition is satisfied, the cryptographic token 110 is automatically expired and is no longer usable for authentication of the constrained device 102. For example, the cryptographic token 110 may be subject to a time limit (e.g., an expiration date, an expiration time, etc.) after which the cryptographic token 110 may be automatically expired. As another illustrative example, the cryptographic token 110 may be subject to a usage limit, wherein when the cryptographic token 110 is used a number of times that is equal to the usage limit, the cryptographic token 110 is automatically expired. If the cryptographic token 110 becomes expired, the constrained device 102 may be required to submit a new secured access token request to the ZTD manager 106 to obtain a new cryptographic token that may be used to authenticate the constrained device 102.

In some instances, the token response from the ZTD manager 106 may include a plurality of cryptographic tokens, each of which may be used by the constrained device 102 to access multiple resources. Each individual cryptographic token may be subject to its own set of expiration conditions, as described above, but may otherwise encode the IMSI and private APN associated with the constrained device 102 to allow for authentication of the constrained device 102 by these multiple resources. In an embodiment, one or more services implemented on the constrained device 102 can reuse the same cryptographic token 110 for accessing different resources 108. Alternatively, a unique cryptographic token may be assigned to each of these one or more services as cryptographic tokens are required by each of these one or more services for accessing different resources 108.

As noted above, the constrained device 102 may operate under various resource constraints such as limited battery and compute capabilities, limited memory capacity, and limited communications bandwidth and ability to communicate with other devices and systems. For instance, the constrained device 102 may have limited or no persistent storage capacity to encrypt and store cryptographic tokens. Accordingly, the constrained device 102 may never store the cryptographic token 110 using persistent storage, as this type of storage may not be available to the constrained device 102. Instead, in an embodiment, the cryptographic token 110 is cached by the constrained device 102 using cache memory.

In an embodiment, once the constrained device 102 has obtained the cryptographic token 110 from the ZTD manager 106, the constrained device 102 can connect to a secured resource 108 using the cryptographic token 110. For instance, the constrained device 102 may transmit a request to a secured resource 108 to establish a secure communications session with the secured resource 108. In some instances, this secure communications session may be established through TLS-based authentication, Datagram TLS (DTLS)-based authentication, or other communications protocol-based authentication methods. In response to the request, the secured resource 108 may access the ZTD manager 106 to obtain a cryptographic token 112 that corresponds to the cryptographic token 110 provided by the ZTD manager 106 to the constrained device 102 and provided in the request to the secured resource 108. This second cryptographic token 112 may be used by the secured resource to authenticate the cryptographic token 110 and the constrained device 102 in order to establish the secure communications session with the constrained device 102.

In some instances, to obtain the second cryptographic token 112 usable to authenticate the constrained device 102 and to establish the secure communications session with the constrained device 102, the secured resource 108 may provide the received cryptographic token 110 to the ZTD manager 106 for validation. The ZTD manager 106 may evaluate the cryptographic token 110 provided by the secured resource 108 to ensure that the cryptographic token 110 is not expired (based on time and/or usage limits) and that the cryptographic token 110 corresponds to the IMSI and private APN associated with the constrained device 102 (such as through decryption of the cryptographic token 110, etc.). If the ZTD manager 106 determines that the cryptographic token 110 is valid, the ZTD manager 106 may return the second cryptographic token 112 to the secured resource 108 for establishing the secure communications session with the constrained device 102.

Figure 2:
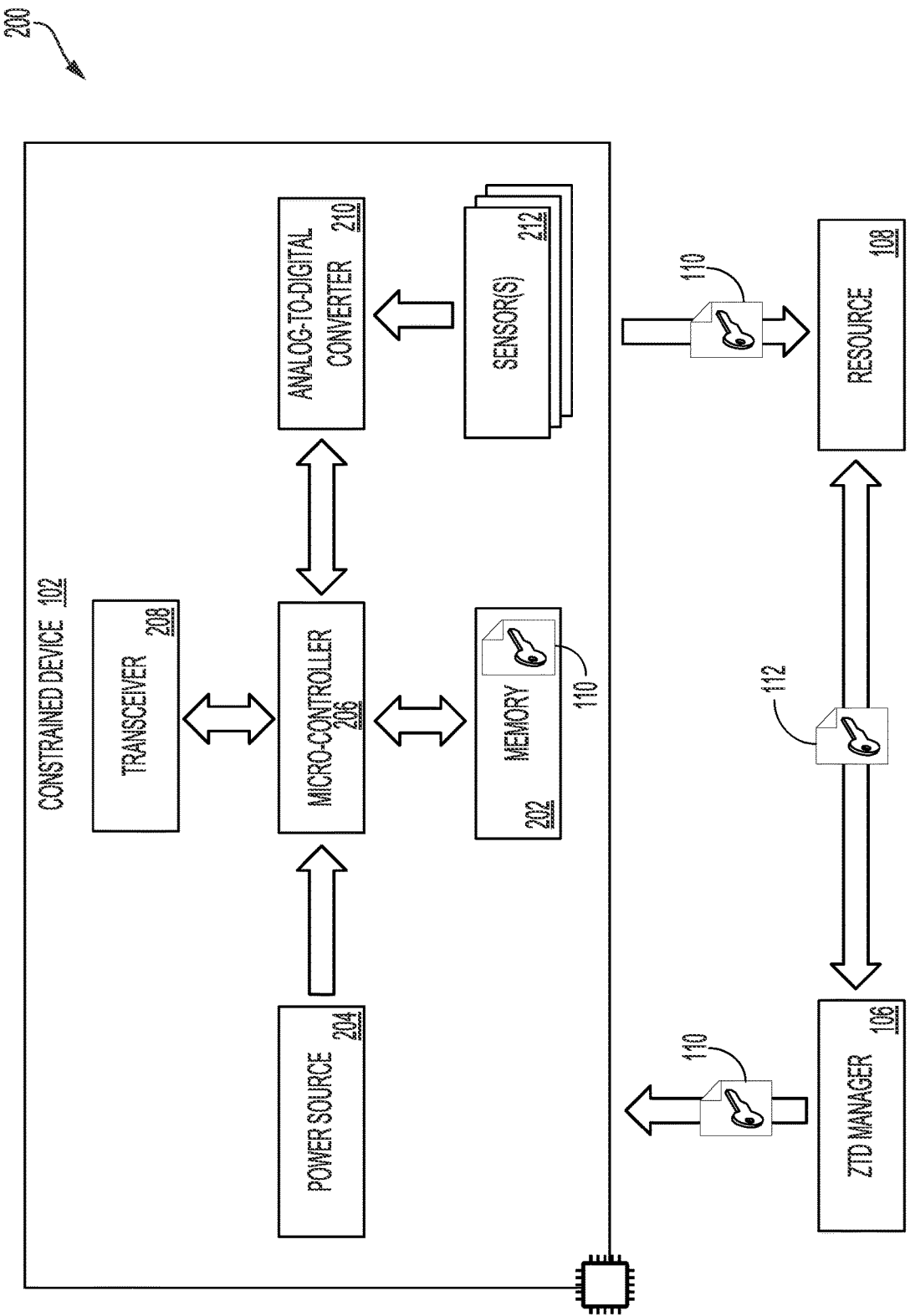
FIG. 2 shows an illustrative example of an environment in which a constrained device obtains a cryptographic token from a ZTD manager that can be used to perform secure communications with a secured resource in accordance with at least one embodiment.

FIG. 2 shows an illustrative example of an environment 200 in which a constrained device 102 obtains a cryptographic token 110 from a ZTD manager 106 that can be used to perform secure communications with a secured resource 108 in accordance with at least one embodiment. As noted above, a constrained device 102 may operate under various resource constraints such as limited battery and compute capabilities, limited memory capacity, and limited communications bandwidth and ability to communicate with other devices and systems. In the environment 200, the constrained device 102 may include several components that collectivity may provide the required functionality for the constrained device 102 within the network architecture while operating subject to the defined resource constraints.

Constrained devices, such as constrained device 102, may be classified into different categories or classes based on their characteristics. For example, as defined in the Internet Engineering Task Force (IETF) Request for Comments (RFC) 7228 (hereby incorporated in its entirety by reference), constrained devices may be assigned different class designations based on their capabilities. These class designations may be assigned based on the distinguishable clusters of commercially available microchips and design cores for constrained devices. As defined in RFC 7228, constrained devices may be divided into three classes: Class 0, Class 1, and Class 2 devices.

Class 0 devices may include constrained sensor nodes or motes that may perform a minimal measure of processing while obtained sensor information from its environment and transmitting this sensor information to other nodes and resources within the network architecture. These devices may be severely constrained in memory and processing capabilities such that secure communications with other resources, such as secured resource 108, may be difficult. In an embodiment, the constrained device 102 is a Class 0 device comprising memory 202, a power source 204, a micro-controller 206, a transceiver 208, an analog-to-digital converter 210, and one or more sensors 212. As defined in RFC 7228, the memory 202 included in a Class 0 device may be constrained to having less than 10 kilobytes of random-access memory (RAM) and less than 100 kilobytes of flash memory. The amount of memory 202 within the constrained device 108 may be insufficient to provide persistent storage for encryption and storage of cryptographic keys. In some instances, the memory 202 may be defined as cache memory, whereby the memory 202 may be incapable of providing persistent storage.

The power source 204 of the constrained device 102 may include batteries or small energy harvesting components (e.g., solar power cells, etc.) that may provide limited power to the constrained device 102 over time. Due to the limitations of the power source 204 of the constrained device 102, the constrained device 102 may be powered off at any point in time when not required to communicate with other nodes or resources, such as secured resource 108. Thus, the constrained device 102 may be activated automatically when necessary to communicate with these other nodes or resources and for limited or brief periods of time.

The micro-controller 206 implemented on a constrained device 102 may provide limited processing capabilities and may be pre-configured to perform certain functionality. For example, the micro-controller 206 may control the functionality of the various components of the constrained device 102, including limited data processing of sensor data obtained from one or more sensors 212 through an analog-to-digital converter 210. Further, the micro-controller 206 may control a transceiver 208, through which the constrained device 102 may communicate with other nodes and resources within the network architecture. However, the transceiver 208 may be implemented to communicate via low power wireless protocols, including (but not limited to) Bluetooth low energy (BLE), IPv6 over Low-Power Wireless Personal Area Networks (6LoWPANs), Zigbee, Thread, WirelessHART (or any other communications protocol relying on the Institute of Electrical and Electronics Engineers (IEEE) 802.15.4 technical standard), low-power wide-area networks (LPWANs), and the like.

In an embodiment, the micro-controller 206, through the transceiver 208, transmits a secured access token request to the ZTD manager 106 to request a cryptographic token 110 that may be used to establish a communications session with a secured resource 108. As noted above, the constrained device 102 may include an eSIM or other SIM card that includes a set of SIM-based credentials associated with the constrained device 102. Accordingly, the micro-controller 206, through the transceiver 208, may include the set of SIM-based credentials as well as the IP address allocated to the eSIM or other SIM card, in the secured access token request to the ZTD manager 106.

In response to the secured access token request, the ZTD manager 106 may provide a token response that includes the cryptographic token 110. This cryptographic token 110, as noted above, may encode the IMSI and private APN associated with the constrained device 102, such as through one or more Base64 encoding schemes or any other available and appropriate encoding schemes. The micro-controller 206, in response to receiving the cryptographic token 110 from the ZTD manager 106 through the transceiver 208, may cache the cryptographic token 110 within cache memory 202. As noted above, the cryptographic token 110 may be subject to one or more expiration conditions, whereby if an expiration condition is satisfied, the cryptographic token 110 is automatically expired and is no longer usable for authentication of the constrained device 102. These one or more expiration conditions may include a time limit and/or usage limit for use of the cryptographic token 110. If the cryptographic token 110 becomes expired, the micro-controller 206, through the transceiver 208, may be required to submit a new secured access token request to the ZTD manager 106 to obtain a new cryptographic token that may be used to authenticate the constrained device 102. In some instances, due to the power constraints imposed on the constrained device 102, and because the constrained device 102 may not include persistent storage for the maintenance of cryptographic keys, if the constrained device 102 is powered off at any point in time, the cryptographic token 110 may be removed from memory 202. Accordingly, when powered on again at a later time, the micro-controller 206, through the transceiver 208, may be required to submit a new secured access token request to the ZTD manager 106 to obtain a new cryptographic token that may be used to authenticate the constrained device 102.

Once the cryptographic token 110 has been obtained from the ZTD manager 106, the micro-controller 206, through the transceiver 208, may connect to the secured resource 108 using the cryptographic token 110 obtained from the cache memory 202. Through the transceiver 208, the micro-controller 206 may transmit a request to the secured resource 108 to establish a secure communications session with the secured resource 108. As noted above, in response to the request, the secured resource 108 may access the ZTD manager 106 to obtain a cryptographic token 112 that corresponds to the cryptographic token 110 provided by the ZTD manager 106 to the constrained device 102 and provided in the request to the secured resource 108. This second cryptographic token 112 may be used by the secured resource to authenticate the cryptographic token 110 and the constrained device 102 in order to establish the secure communications session with the constrained device 102.

Figure 3:
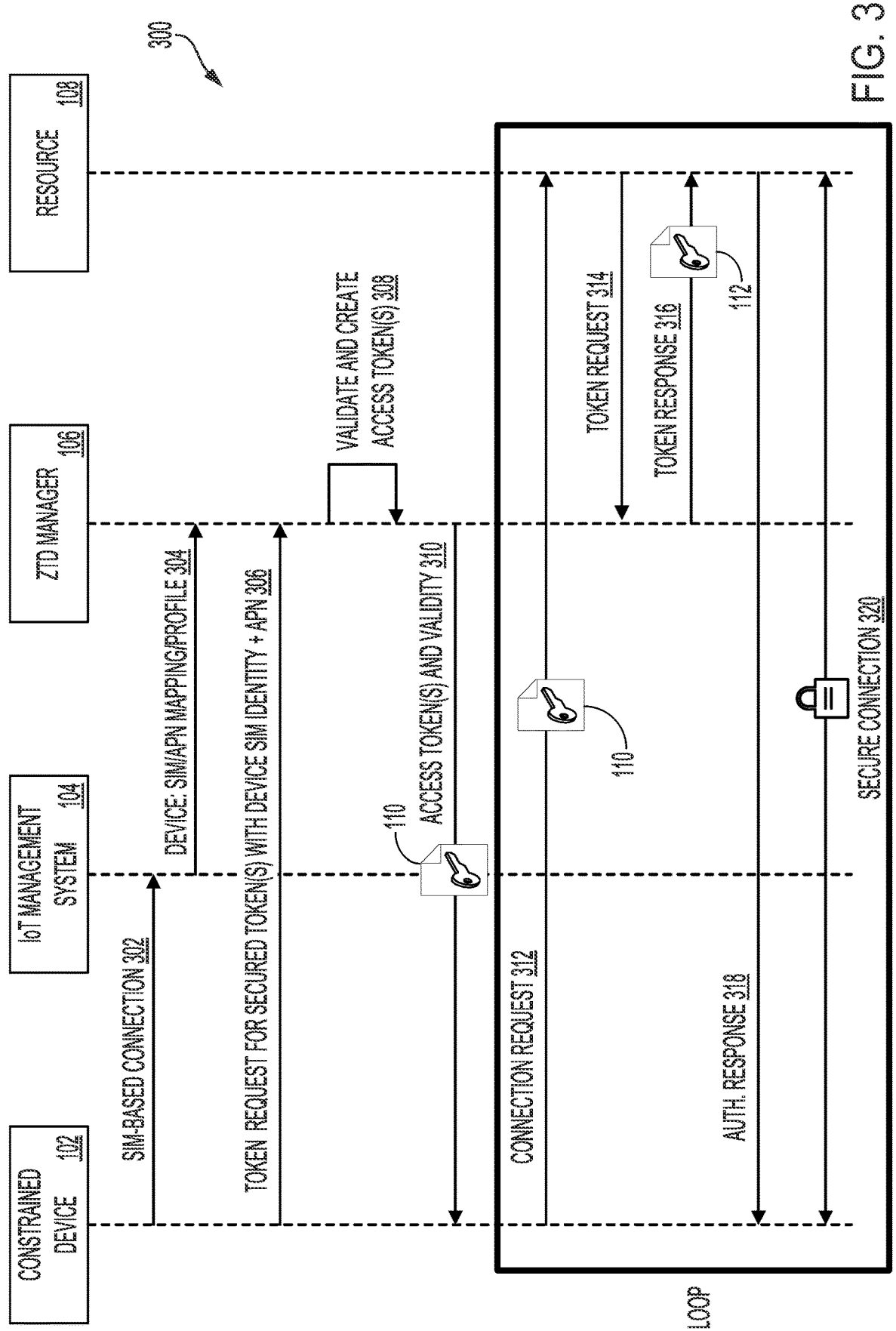
FIG. 3 shows an illustrative example of a flow diagram comprising various operations for facilitating the dynamic assignment of cryptographic tokens to a constrained device and to secured resources to enable authentication of the constrained device and the secured resources in accordance with at least one embodiment.

FIG. 3 shows an illustrative example of a flow diagram 300 comprising various operations for facilitating the dynamic assignment of cryptographic tokens to a constrained device and to secured resources to enable authentication of the constrained device 102 and the secured resources 108 in accordance with at least one embodiment. In the flow diagram 300, a constrained device 102, at step 302, may establish a SIM-based connection with an IoT management system 104. For instance, when the constrained device 102 is initially powered on, the constrained device 102 may automatically transmit a communication to the IoT management system 104 to establish the SIM-based connection with the IoT management system 104. This communication may include a set of SIM-based credentials that may be used to authenticate the constrained device 102. As noted above, the SIM-based credentials may include an IMSI and/or IMEI that may uniquely identify the constrained device 102. Further, the SIM-based credentials may include an ICCID that uniquely identifies the eSIM or other SIM card implemented on the constrained device 102.

In response to the communication from the constrained device 102, the IoT management system 104 may use an active communication profile associated with the constrained device 102 to validate the provided set of SIM-based credentials and, hence, the constrained device 102. For instance, the IoT management system 104 may process the obtained SIM-based credentials against the known active communication profile for the constrained device 102 to determine whether the SIM-based credentials are valid. If there is a mismatch, the IoT management system 104 may determine that the constrained device 102 cannot be validated and, as a result, may automatically terminate the SIM-based connection with the constrained device 102. As noted above, a mismatch between the provided SIM-based credentials and the known credentials maintained in the active communication profile for the constrained device 102 may be indicative of a SIM replacement within the constrained device 102, spoofing of the constrained device 102 by an unauthorized entity, IMSI/IMEI theft, and the like.

If the IoT management system 104 validates the constrained device 102, the IoT management system 104, at step 304, may push the active communication profile for the constrained device 102 to the ZTD manager 106 associated with the private APN indicated by the constrained device 102. As noted above, the ZTD manager 106 may serve as the secured credential manager for all secured communications to and from the constrained device 102 and may further automate the dynamic assignment of cryptographic tokens to the constrained device 102 and secured resources 108 within the network domain.

In some instances, if the constrained device 102 is validated by the IoT management system 104, the IoT management system 104 may allow the constrained device 102 to establish a network connection on the ZTD private APN. Through the ZTD private APN, the constrained device 102, at step 306, may transmit a secured access token request to the ZTD manager 106 to request a cryptographic token 110 that may be used to establish a secure communications session with one or more secured resources 108 within the network. The constrained device 102 may provide, with the secured access token request, the SIM-based credentials associated with the constrained device 102 and the IP address allocated to the eSIM or other SIM card implemented on the constrained device 102.

At step 308, the ZTD manager 106 may evaluate the SIM-based credentials against the active communication profile for the constrained device 102 provided by the IoT management system 104 to determine whether the provided SIM-based credentials and the known ICCID and IMSI/IMEI for the constraint device 102 from the known active communication profile match. Further, the ZTD manager 106 may validate the IP address allocated to the eSIM or other SIM card associated with the constrained device 102 by providing the IP address and the ICCID associated with the constrained device 102 to the IoT management system 104. If the ZTD manager 106 is unable to validate the provided SIM-based credentials and/or the IP address associated with the constrained device 102, the ZTD manager 106 may deny the secured access token request.

If the ZTD manager 106 determines that the constrained device 102 has been validated based on the provided SIM-based credentials and IP address allocated to the eSIM or other SIM card associated with the constrained device 102, the ZTD manager 106, at step 310, may return a token response to the constrained device 102. The token response may include a cryptographic token 110 that encodes the IMSI and private APN associated with the constrained device 102. As noted above, in some instances, the provided cryptographic token 110 may be subject to one or more expiration conditions. For example, the cryptographic token 110 may be subject to a time-based expiration condition (e.g., an expiration date, an expiration time, etc.) after which the cryptographic token 110 may be automatically expired. Additionally, or alternatively, the cryptographic token 110 may be subject to a usage-based expiration condition, whereby if the cryptographic token 110 is used a set number of times, the cryptographic token 110 is automatically expired. The constrained device 102 may store the cryptographic token 110 in cache memory, as described herein.

Once the constrained device 102 has obtained a cryptographic token 110 from the ZTD manager 106, the constrained device 102, at step 312, may transmit a connection request to a secured resource 108 to establish a secure communications session between the constrained device 102 and the secured resource 108. The connection request may include the cryptographic token 110 from the cache memory of the constrained device 102 and provided by the ZTD manager 106.

In response to the connection request from the constrained device 102, the secured resource 108, at step 314, may transmit a token request to the ZTD manager 106 to obtain a second cryptographic token 112 that may be used to validate the connection request from the constrained device 102. The token request, in some instances, may include the cryptographic token 110 provided by the constrained device 102 for validation by the ZTD manager 106. The ZTD manager 106 may evaluate the cryptographic token 110 provided by the secured resource 108 to ensure that the cryptographic token 110 is not expired and that the cryptographic token 110 corresponds to the IMSI and private APN associated with the constrained device 102 (such as through decryption of the cryptographic token 110, etc.). If the ZTD manager 106 determines that the cryptographic token 110 is not valid (e.g., the cryptographic token 110 is expired, the cryptographic token 110 does not correspond to the constrained device 102, etc.), the ZTD manager 106 may transmit a token response indicating that the constrained device 102 could not be validated. This may cause the secured resource 108 to reject the connection request.

If the ZTD manager 106 determines that constrained device 102 has been validated, the ZTD manager 106, at step 316, may return a token response that includes a second cryptographic token 112 for use in establishing the secure communications session between the constrained device 102 and the secured resource 108. The secured resource 108 may use the second cryptographic token 112 to provide, at step 318, an authentication response and to establish, at step 320, the secure communications session with the constrained device 102.

As noted above, the cryptographic token 110 may be subject to one or more expiration conditions, whereby if an expiration condition is satisfied, the cryptographic token 110 is automatically expired. If the cryptographic token 110 is expired, the constrained device 102 may be required to submit a new token request to the ZTD manager 106 to obtain a new cryptographic token that may be used to continue the secure communications session with the secured resource 108. In some instances, the cryptographic token 110 may be used multiple times subject to a communications session refresh interval, whereby after this refresh interval has passed, the constrained device 102 may be required to submit a new connection request to the secured resource 108 using either a new cryptographic token from the ZTD manager 106 (if the old cryptographic token is expired) or the previously issued cryptographic token 110 (if the old cryptographic token is not expired). Accordingly, steps 312-320 may be continuously performed as new cryptographic tokens are issued to the constrained device 102 over time.

Figure 4:
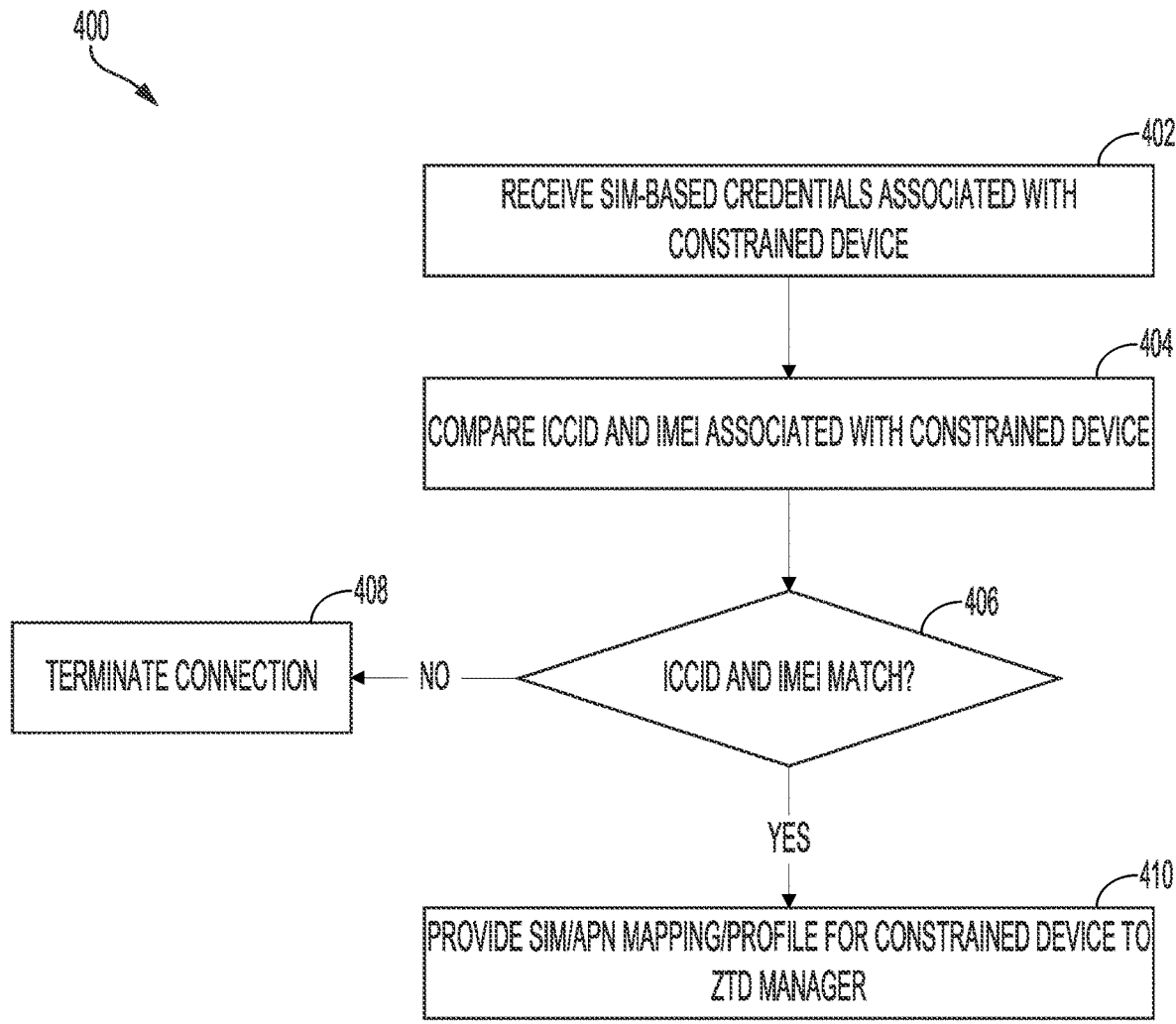
FIG. 4 shows an illustrative example of a process for authenticating a constrained device based on a set of subscriber identity module (SIM)-based credentials associated with the constrained device in order to provide a ZTD manager with a profile corresponding to the constrained device in accordance with at least one embodiment.

FIG. 4 shows an illustrative example of a process 400 for authenticating a constrained device based on a set of SIM-based credentials associated with the constrained device in order to provide a ZTD manager with a profile corresponding to the constrained device in accordance with at least one embodiment. The process 400 may be performed by an IoT management system, which may maintain active communication profiles for various constrained devices for authentication and access control of these various constrained devices per 3GPP standards.

At step 402, the IoT management system may receive a set of SIM-based credentials associated with a constrained device. As noted above, when a constrained device is activated, the constrained device may automatically attempt to establish a SIM-based connection with the IoT management system. The request to establish this SIM-based connection may include a set of SIM-based credentials associated with the constrained device 102, as well as a private APN corresponding to the constrained device 102 for use within the private network, as described herein. The SIM-based credentials may be encoded on an eSIM or other SIM card implemented on the constrained device. The SIM-based credentials may include an IMSI and/or IMEI that uniquely identify the constrained device, as well as an ICCID that may uniquely identify the eSIM or other SIM card implemented on the constrained device.

At step 404, the IoT management system may compare the ICCID and IMSI/IMEI associated with the constrained device to the known ICCID and IMSI/IMEI from the active communication profile associated with the constrained device. Based on this comparison, the IoT management system, at step 406, may determine whether the ICCID and IMSI/IMEI provided by the constrained device match the known ICCID and IMSI/IMEI from the active communication profile.

If the IoT management system determines that there is a mismatch between the provided SIM-based credentials and those maintained in the known active communication profile for the constrained device, the IoT management system, at step 408, may automatically terminate the SIM-based connection with the constrained device. As noted above, a mismatch between the provided SIM-based credentials and the known SIM-based credentials from the active communication profile associated with the constrained device may be indicative of a SIM replacement within the constrained device, spoofing of the constrained device, IMSI/IMEI theft, and the like. Accordingly, the IoT management system may be unable to validate the constrained device.

If the IoT management system determines that the ICCID and IMSI/IMEI provided by the constrained device match the known ICCID and IMSI/IMEI from the active communication profile associated with the constrained device, the IoT management system, at step 410, may provide the active communication profile, including the SIM-based credentials and the APN mapping for the constrained device, to the ZTD manager. As noted above, the ZTD manager may use the active communication profile to authenticate incoming secured access token requests from the constrained device for cryptographic tokens that may be used to establish secure communications sessions between the constrained device and other secured resources within the network. The IoT management system may transmit, to the constrained device, a notification to acknowledge that the constrained device has been successfully validated and that it may proceed to communicate with the ZTD manager in order to obtain the aforementioned cryptographic tokens for establishing secure communications sessions with these other secured resources.

In an embodiment, the IoT management system continues to track the binding between the constrained device and the eSIM or other SIM card after the initial onboarding of the constrained device described above in connection with FIG. 4 to ensure that the constrained device and the eSIM or other SIM card have not been compromised. For instance, the IoT management system may periodically or in response to a triggering event (e.g., a request from the ZTD manager to validate an IP address allocated to the eSIM or other SIM card implemented on the constrained device, an indication of a possible compromise of the constrained device, etc.), prompt the constrained device to report its ICCID and IMSI/IMEI to the IoT management system. The IoT management system may compare the reported ICCID and IMSI/IMEI to the known ICCID and IMSI/IMEI from the active communication profile associated with the constrained device to ensure that these SIM-based credentials match. If there is a mismatch, the IoT management system may prevent the constrained device from accessing secured resources within the network and may terminate any existing connections associated with the constrained device.

Figure 5:
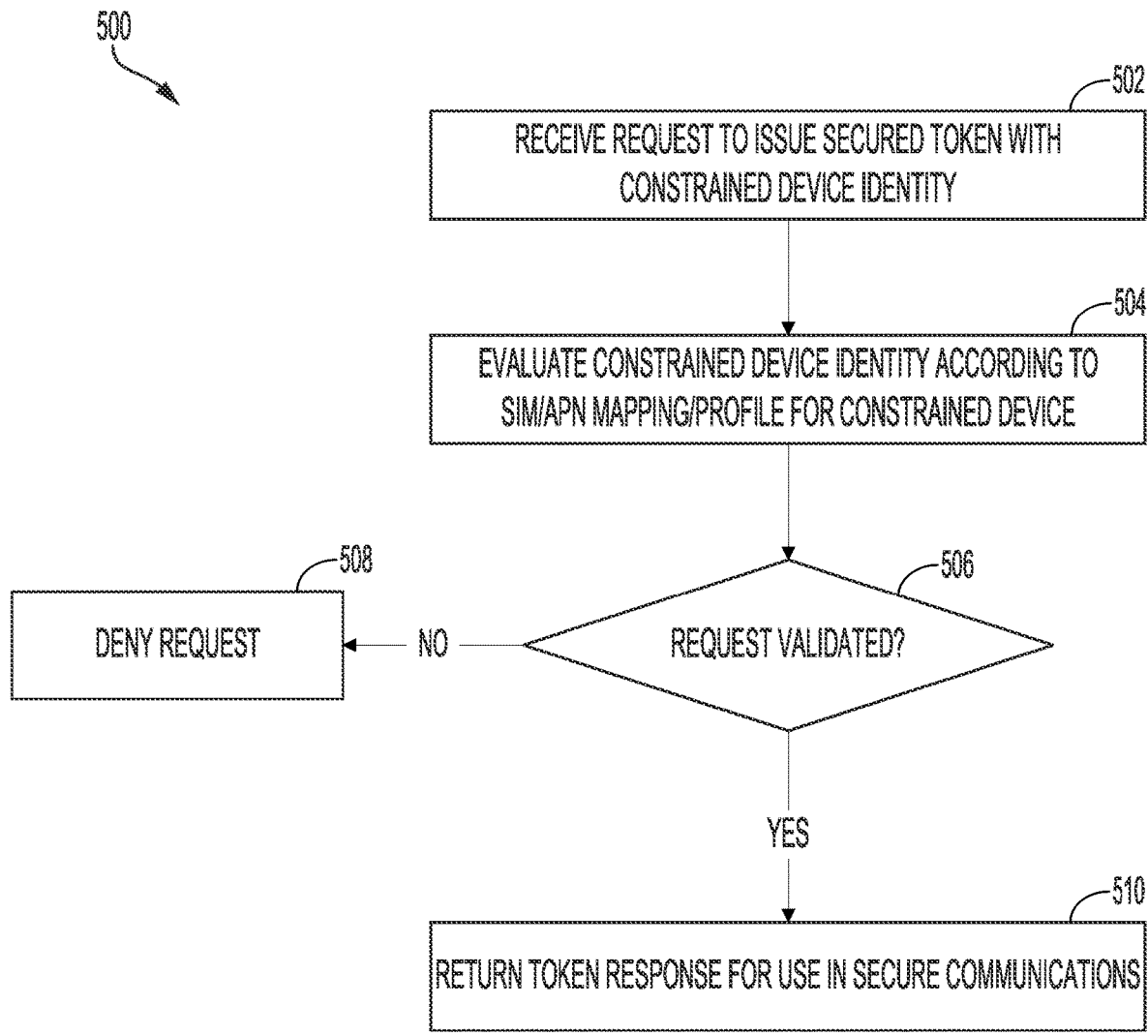
FIG. 5 shows an illustrative example of a process for providing a cryptographic token in response to a request from a constrained device in accordance with at least one embodiment.

FIG. 5 shows an illustrative example of a process 500 for providing a cryptographic token in response to a request from a constrained device in accordance with at least one embodiment. The process 500 may be performed by the aforementioned ZTD manager. As noted above, the ZTD manager is a secured credential manager for all secured communications to and from constrained devices within the network. Further, the ZTD manager may automate the dynamic assignment of cryptographic tokens to constrained devices and secured resources within the OTT/enterprise network domain.

At step 502, the ZTD manager may receive a request to issue a secured token with a constrained device SIM identity. For instance, when a constrained device is to establish a secure communications session with a particular secured resource, the constrained device may transmit a secured access token request to the ZTD manager to request a cryptographic token that may be used to establish this secure communications session with the secured resource. This secured access token request from the constrained device may include a set of SIM-based credentials associated with the constrained device, as well as the IP address allocated to the eSIM or other SIM card implemented on the constrained device.

At step 504, the ZTD manager may evaluate the provided constrained device identity (e.g., SIM-based credentials and IP address allocated to the eSIM or other SIM card, etc.) against the active communication profile associated with the constrained device and provided by the IoT management system. For instance, the ZTD manager may compare the SIM-based credentials from the constrained device and the known ICCID and IMSI/IMEI for the constraint device from the known active communication profile. In some instances, the ZTD manager may further provide the obtained IP address and ICCID associated with the constrained device (as determined based on the request) to the IoT management system for evaluation.

At step 506, the ZTD manager may determine whether the obtained request from the constrained device can be validated. For instance, through evaluation of the provided constrained device identity against the active communication profile associated with the constrained device, the ZTD manager may determine whether the SIM-based credentials from the constrained device and the known ICCID and IMSI/IMEI for the constraint device from the known active communication profile match. Further, through the IoT management system, the ZTD manager may evaluate the obtained IP address and the ICCID associated with the constrained device to determine whether an association between this IP address and the ICCID exists, whereby if an association does exist, the IP address may be considered to be valid.

If the ZTD manager determines that the request cannot be validated, the ZTD manager, at step 508, may deny the request from the constrained device. Additionally, in some instances, the ZTD manager may transmit a notification to the IoT management system to indicate that the constrained device could not be validated. The IoT management system, in response to this notification from the ZTD manager, may terminate network connectivity for the constrained device. Additionally, and or alternatively, the notification from the ZTD manager may cause the IoT management system to perform an evaluation of the binding between the constrained device to the eSIM or other SIM card implemented on the constrained device to determine whether the ICCID and IMSI/IMEI associated with the constrained device matches the known ICCID and IMSI/IMEI for the constrained device specified in the known active communication profile for the constrained device. Based on this evaluation, the IoT management system may perform additional remedial actions (e.g., preventing the constrained device from accessing secured resources within the network, terminating any existing connections associated with the constrained device, etc.).

If the ZTD manager determines that the request from the constrained device has been validated, the ZTD manager, at step 510, may return a token response for use in secure communications sessions with other secured resources within the network. The token response may include a cryptographic token that encodes the IMSI and private APN associated with the constrained device. As noted above, the cryptographic token may be subject to one or more expiration conditions such that, if an expiration condition applicable to the cryptographic token is satisfied, the cryptographic token is automatically expired. For example, the cryptographic token may be subject to a time-based expiration condition after which the cryptographic token may be automatically expired. Additionally, or alternatively, the cryptographic token may be subject to a usage-based expiration condition, whereby if the cryptographic token is used a set number of times, the cryptographic token is automatically expired.

Figure 6:
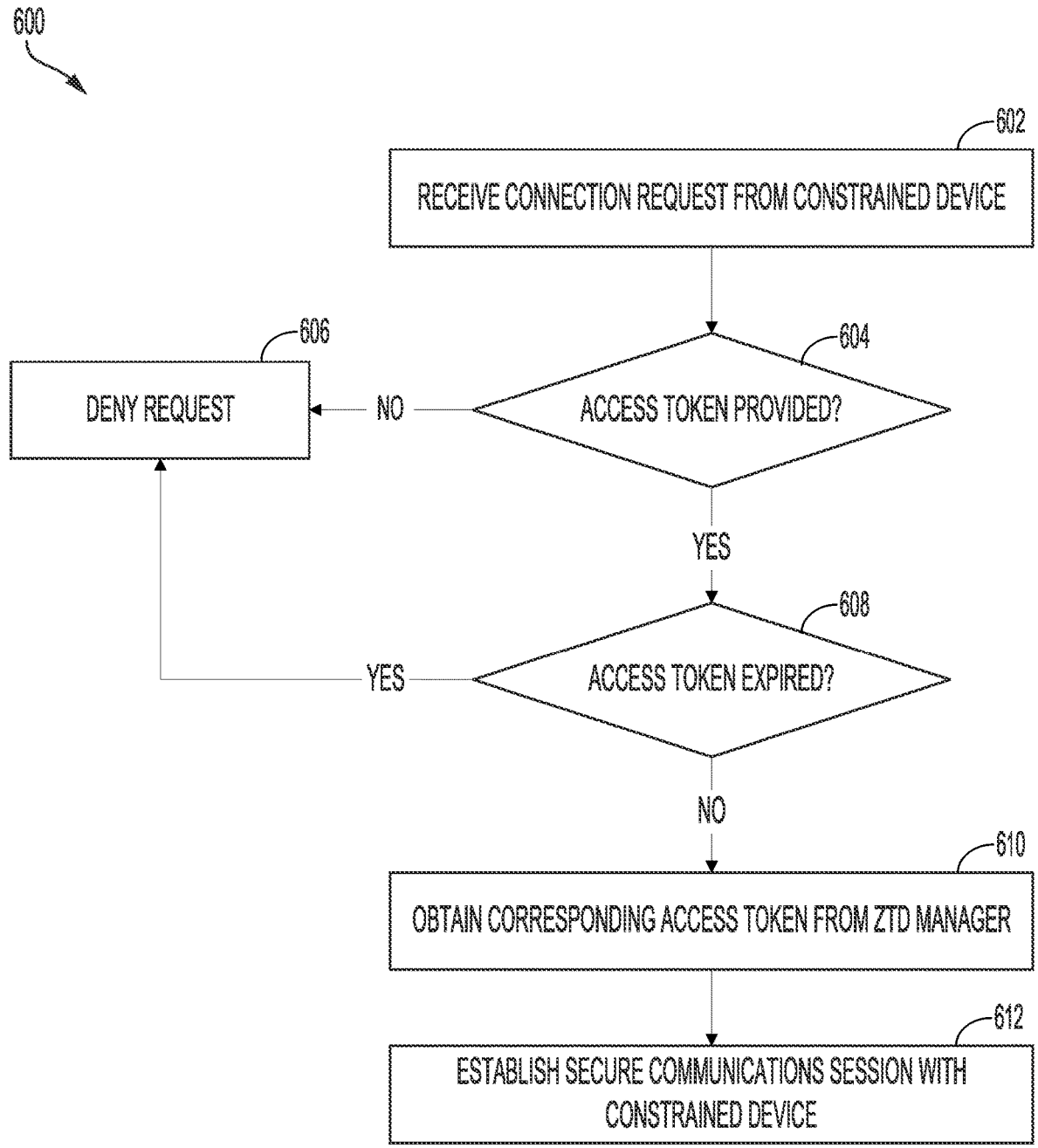
FIG. 6 shows an illustrative example of a process for establishing a secure communications session with a constrained device based on authentication of a provided access token in accordance with at least one embodiment.

FIG. 6 shows an illustrative example of a process 600 for establishing a secure communications session with a constrained device based on authentication of a provided access token in accordance with at least one embodiment. The process 600 may be performed by any secured resource within a network that may be able to establish a secure communications session with a constrained device. The secured resource, in some instances, may be a gateway or other smart device within the network that is not subject to the various resource constraints (e.g., limited battery and compute capabilities, limited memory capacity, limited communications bandwidth and ability to communicate with other devices and systems, etc.) as the constrained devices within the network.

At step 602, the secured resource may receive a connection request from a constrained device. In response to the connection request, the secured resource may determine, at step 604, whether a cryptographic token has been included in the connection request. As noted above, the connection request from the constrained device may include a cryptographic token issued by the ZTD manager and for use in establishing a secure communications session with one or more secured resources within the network. If the secured resource determines that the connection request does not include a cryptographic token associated with the constrained device, the secured resource, at step 606, may automatically reject the connection request. The absence of a cryptographic token may prevent the secured resource from being able to authenticate the constrained device, which may cause the secured resource to determine that a secure communications session with the constrained device cannot be established.

If the secured resource determines that the connection request includes a cryptographic token associated with the constrained device, the secured resource, at step 608, may determine whether the provided cryptographic token is expired. As noted above, the cryptographic token may be subject to one or more expiration conditions whereby if an expiration condition is satisfied, the cryptographic token is automatically expired and is no longer usable for authentication of the constrained device. For example, the cryptographic token may be subject to a time limit after which the cryptographic token may be automatically expired. As another illustrative example, the cryptographic token may be subject to a usage limit, wherein when the cryptographic token is used a number of times that is equal to the usage limit, the cryptographic token is automatically expired.

To determine whether the cryptographic token is expired, the secured resource may transmit a request to the ZTD manager to evaluate the obtained cryptographic token. The ZTD manager may evaluate the cryptographic token provided by the secured resource to ensure that the cryptographic token is not expired and that the cryptographic token corresponds to the IMSI and private APN associated with the constrained device (such as through decryption of the cryptographic token, etc.). If the ZTD manager determines that the cryptographic token is not valid (e.g., the cryptographic token is expired, the cryptographic token does not correspond to the constrained device, etc.), the ZTD manager may transmit a token response indicating that the constrained device could not be validated. This may cause the secured resource, at step 606, to deny the connection request.

In some instances, the cryptographic token provided by the constrained device may be transmitted in a token request from the secured resource to the ZTD manager to obtain, at step 610, a corresponding cryptographic token that may be used to establish the secure communications session between the secured resource and the constrained device. If the ZTD manager determines that the provided cryptographic token and, hence, the constrained device have been validated, the ZTD manager may return a token response that includes a second cryptographic token that may be used by the secured resource to establish the secure communications session between the constrained device and the secured resource. At step 612, the secured resource may use this second cryptographic token to provide an authentication response to the constrained device and to establish the secure communications session with the constrained device.

FIG. 7 illustrates an example network device 700 suitable for performing switching, routing, and other networking operations in accordance with some implementations. Network device 700 includes a CPU 704, interfaces 702, and a connection 710 (e.g., a Peripheral Component Interconnect (PCI) bus). When acting under the control of appropriate software or firmware, the CPU 704 is responsible for executing packet management, error detection, and/or routing functions. The CPU 704 can accomplish these functions under the control of software including an operating system and any appropriate applications software. The CPU 704 may include one or more processors 708, such as a processor from the Intel® X98 family of microprocessors. In some cases, the processor 708 can be specially designed hardware for controlling the operations of network device 700. In some cases, a memory 706 (e.g., non-volatile RAM, ROM, etc.) also forms part of the CPU 704. However, there are many different ways in which memory could be coupled to the system.

The interfaces 702 are typically provided as modular interface cards (sometimes referred to as "line cards"). Generally, they control the sending and receiving of data packets over the network and sometimes support other peripherals used with the network device 700. Among the interfaces that may be provided are Ethernet interfaces, frame relay interfaces, cable interfaces, Digital Subscriber Line (DSL) interfaces, token ring interfaces, and the like. In addition, various very high-speed interfaces may be provided such as fast token ring interfaces, wireless interfaces, Ethernet interfaces, Gigabit Ethernet interfaces, Asynchronous Transfer Mode (ATM) interfaces, High-Speed Serial Interface (HSSI) interfaces, Packet Over SONET/SDH (POS) interfaces, Fiber Distributed Data Interface (FDDI) interfaces, WiFi interfaces, 3G/4G/5G cellular interfaces, Controller Area Network (CAN) bus, Long Range (LoRa), and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 704 to efficiently perform routing computations, network diagnostics, security functions, etc.

Although the system shown in FIG. 7 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 700.

Regardless of the network device's configuration, it may employ one or more memories or memory modules (including memory 706) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 706 could also hold various software containers and virtualized execution environments and data.

The network device 700 can also include an application-specific integrated circuit (ASIC) 712, which can be configured to perform routing and/or switching operations. The ASIC 712 can communicate with other components in the network device 700 via the connection 710, to exchange data and signals and coordinate various types of operations by the network device 700, such as routing, switching, and/or data storage operations, for example.

FIG. 8 illustrates a computing system architecture 800 including various components in electrical communication with each other using a connection 806, such as a bus, in accordance with some implementations. Example system architecture 800 includes a processing unit (CPU or processor) 804 and a system connection 806 that couples various system components including the system memory 820, such as ROM 818 and RAM 816, to the processor 804. The system architecture 800 can include a cache 802 of high-speed memory connected directly with, in close proximity to, or integrated as part of the processor 804. The system architecture 800 can copy data from the memory 820 and/or the storage device 808 to the cache 802 for quick access by the processor 804. In this way, the cache can provide a performance boost that avoids processor 804 delays while waiting for data. These and other modules can control or be configured to control the processor 804 to perform various actions.

Other system memory 820 may be available for use as well. The memory 820 can include multiple different types of memory with different performance characteristics. The processor 804 can include any general purpose processor and a hardware or software service, such as service 1 810, service 2 812, and service 3 814 stored in storage device 808, configured to control the processor 804 as well as a special-purpose processor where software instructions are incorporated into the actual processor design. The processor 804 may be a completely self-contained computing system, containing multiple cores or processors, a bus, memory controller, cache, etc. A multi-core processor may be symmetric or asymmetric.

To enable user interaction with the computing system architecture 800, an input device 822 can represent any number of input mechanisms, such as a microphone for speech, a touch-sensitive screen for gesture or graphical input, keyboard, mouse, motion input, speech and so forth. An output device 824 can also be one or more of a number of output mechanisms known to those of skill in the art. In some instances, multimodal systems can enable a user to provide multiple types of input to communicate with the computing system architecture 800. The communications interface 826 can generally govern and manage the user input and system output. There is no restriction on operating on any particular hardware arrangement and therefore the basic features here may easily be substituted for improved hardware or firmware arrangements as they are developed.

Storage device 808 is a non-volatile memory and can be a hard disk or other types of computer readable media which can store data that are accessible by a computer, such as magnetic cassettes, flash memory cards, solid state memory devices, digital versatile disks, cartridges, RAMs 816, ROM 818, and hybrids thereof.

The storage device 808 can include services 810, 812, 814 for controlling the processor 804. Other hardware or software modules are contemplated. The storage device 808 can be connected to the system connection 806. In one aspect, a hardware module that performs a particular function can include the software component stored in a computer-readable medium in connection with the necessary hardware components, such as the processor 804, connection 806, output device 824, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

The invention claimed is:

1. A computer-implemented method comprising:
receiving a first request to issue a first cryptographic token, wherein the first cryptographic token is usable to facilitate a communications session between a constrained device and a secured resource, wherein the first request corresponds to the constrained device, and wherein the constrained device lacks secured storage capabilities;
evaluating identity information corresponding to the constrained device according to a known profile associated with the constrained device;
determining that the identity information is valid;
returning a cryptographic token response, wherein the cryptographic token response includes the first cryptographic token, and wherein when the first cryptographic token is received at the constrained device, the constrained device maintains the first cryptographic token in cache memory;
receiving a second request to obtain a second cryptographic token, wherein the second cryptographic token is associated with the first cryptographic token, and wherein the second request corresponds to the secured resource; and providing the second cryptographic token, wherein when the second cryptographic token is received at the secured resource, the secured resource uses the second cryptographic token to validate the first cryptographic token and to facilitate the communications session.

2. The computer-implemented method of claim 1, wherein the first cryptographic token corresponds to an expiration date, and wherein when the expiration date is elapsed, the first cryptographic token is automatically expired.

3. The computer-implemented method of claim 1, wherein the first cryptographic token corresponds to a usage limit, wherein when the first cryptographic token is used a number of times that is equal to the usage limit, the first cryptographic token is automatically expired.

4. The computer-implemented method of claim 1, further comprising:
   receiving a new request to issue a new cryptographic token for a new communications session between the constrained device and the secured resource, wherein the new request is generated as a result of the first cryptographic token being expired;
   validating the identity information corresponding to the constrained device according to the known profile associated with the constrained device; and
   returning the new cryptographic token.

5. The computer-implemented method of claim 1, wherein the constrained device implements a set of services, and wherein the first cryptographic token is usable by the set of services to access the secured resource.

6. The computer-implemented method of claim 1, wherein the constrained device lacks Public Key Infrastructure (PKI) computation capabilities.

7. The computer-implemented method of claim 1, wherein the first cryptographic token and the second cryptographic token are associated with a zero-touch deployment (ZTD) manager, and wherein the ZTD manager assigns the first cryptographic token to the constrained device in response to the first request.

8. A system, comprising:
   one or more processors; and
   memory storing thereon instructions that, as a result of being executed by the one or more processors, cause the system to:
   receive a first request to issue a first cryptographic token, wherein the first cryptographic token is usable to facilitate a communications session between a constrained device and a secured resource, wherein the first request corresponds to the constrained device, and wherein the constrained device lacks secured storage capabilities;
   evaluate identity information corresponding to the constrained device according to a known profile associated with the constrained device;
   determine that the identity information is valid;
   return a cryptographic token response, wherein the cryptographic token response includes the first cryptographic token, and wherein when the first cryptographic token is received at the constrained device, the constrained device maintains the first cryptographic token in cache memory;
   receive a second request to obtain a second cryptographic token, wherein the second cryptographic token is associated with the first cryptographic token, and wherein the second request corresponds to the secured resource; and
   provide the second cryptographic token, wherein when the second cryptographic token is received at the secured resource, the secured resource uses the second cryptographic token to validate the first cryptographic token and to facilitate the communications session.

9. The system of claim 8, wherein the first cryptographic token corresponds to an expiration date, and wherein when the expiration date is elapsed, the first cryptographic token is automatically expired.

10. The system of claim 8, wherein the first cryptographic token corresponds to a usage limit, wherein when the first cryptographic token is used a number of times that is equal to the usage limit, the first cryptographic token is automatically expired.

11. The system of claim 8, wherein the instructions further cause the system to:
    receive a new request to issue a new cryptographic token for a new communications session between the constrained device and the secured resource, wherein the new request is generated as a result of the first cryptographic token being expired;
    validate the identity information corresponding to the constrained device according to the known profile associated with the constrained device; and
    return the new cryptographic token.

12. The system of claim 8, wherein the constrained device implements a set of services, and wherein the first cryptographic token is usable by the set of services to access the secured resource.

13. The system of claim 8, wherein the constrained device lacks Public Key Infrastructure (PKI) computation capabilities.

14. The system of claim 8, wherein the first cryptographic token and the second cryptographic token are associated with a zero-touch deployment (ZTD) manager, and wherein the ZTD manager assigns the first cryptographic token to the constrained device in response to the first request.

15. A non-transitory, computer-readable storage medium storing thereon executable instructions that, as a result of being executed by one or more processors of a computer system, cause the computer system to:
    receive a first request to issue a first cryptographic token, wherein the first cryptographic token is usable to facilitate a communications session between a constrained device and a secured resource, wherein the first request corresponds to the constrained device, and wherein the constrained device lacks secured storage capabilities;
    evaluate identity information corresponding to the constrained device according to a known profile associated with the constrained device;
    determine that the identity information is valid;
    return a cryptographic token response, wherein the cryptographic token response includes the first cryptographic token, and wherein when the first cryptographic token is received at the constrained device, the constrained device maintains the first cryptographic token in cache memory;
    receive a second request to obtain a second cryptographic token, wherein the second cryptographic token is associated with the first cryptographic token, and wherein the second request corresponds to the secured resource; and
    provide the second cryptographic token, wherein when the second cryptographic token is received at the secured resource, the secured resource uses the second cryptographic token to validate the first cryptographic token and to facilitate the communications session.

16. The non-transitory, computer-readable storage medium of claim 15, wherein the first cryptographic token corresponds to an expiration date, and wherein when the expiration date is elapsed, the first cryptographic token is automatically expired.

17. The non-transitory, computer-readable storage medium of claim 15, wherein the first cryptographic token corresponds to a usage limit, wherein when the first cryptographic token is used a number of times that is equal to the usage limit, the first cryptographic token is automatically expired.

18. The non-transitory, computer-readable storage medium of claim 15, wherein the executable instructions further cause the computer system to:

receive a new request to issue a new cryptographic token for a new communications session between the constrained device and the secured resource, wherein the new request is generated as a result of the first cryptographic token being expired;

validate the identity information corresponding to the constrained device according to the known profile associated with the constrained device; and return the new cryptographic token.

19. The non-transitory, computer-readable storage medium of claim 15, wherein the constrained device implements a set of services, and wherein the first cryptographic token is usable by the set of services to access the secured resource.

20. The non-transitory, computer-readable storage medium of claim 15, wherein the constrained device lacks Public Key Infrastructure (PKI) computation capabilities.

* * * * *